US006408430B2

(12) United States Patent
Gunter et al.

(10) Patent No.: US 6,408,430 B2
(45) Date of Patent: *Jun. 18, 2002

(54) INTERACTIVE SOFTWARE TESTING SYSTEM AND METHOD

(75) Inventors: Elsa L. Gunter, Philadelphia, PA (US); Doron A. Peled, Gillette, NJ (US)

(73) Assignee: Lucent Technologies, Inc., NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,865

(22) Filed: Sep. 3, 1998

(51) Int. Cl.[7] ................................................ G06F 9/45
(52) U.S. Cl. ............................................... 717/4; 717/1
(58) Field of Search ................................ 395/704, 709, 395/183.14, 701, 706; 371/19; 717/4, 9, 1, 6; 714/38

(56) References Cited

U.S. PATENT DOCUMENTS

| 5,048,018 A | * | 9/1991 | Bernstein et al. | 717/4 |
| 5,860,009 A | * | 1/1999 | Uchihira et al. | 717/6 |
| 5,889,999 A | * | 3/1999 | Breternitz, Jr. et al. | 717/9 |
| 5,905,856 A | * | 5/1999 | Ottensooser | 714/38 |
| 5,907,706 A | * | 5/1999 | Brodsky et al. | 717/1 |
| 5,956,479 A | * | 9/1999 | McInerney e tal. | 714/38 |
| 5,956,511 A | * | 9/1999 | Tahara | 717/4 |
| 6,243,857 B1 | * | 6/2001 | Logan, III et al. | 717/1 |

OTHER PUBLICATIONS

R. Alur, G. Holzmann, D. Peled, "An Analyzer for Message Sequence" *Charts, Software: Concepts and Tools*, 17 (1996), 70–77.

ITU–T Recommendation Z.120. Message Sequence Chart (MSC), Mar. 1993.

Muchnick, Complier Design Implementation, Morgan Kaufmann Publisher, Inc., Jun. 1997.*

Eichenberg–Davidson, Register Allocation for predicated Code, IEEE Proceedings of Micro–28, Jun. 1995.*

* cited by examiner

*Primary Examiner*—Kakali Chaki
*Assistant Examiner*—Hoang-Vu Anthony Nguyen-Ba (57) ABSTRACT

A method for visualizing and testing a sequence of a software code that includes instructions relating to assignment of variables, and decision branches. The method comprises the steps of generating a plurality of nodes, edges and text indications that correspond to the instructions in the software code. A plurality of pointers are then generated to associate the location of at least one line of the software code to at least one of the generated nodes. The pointers may also associate the location of a line in the software code to at least one of the generated edges. The method then displays a flow chart representing the generated nodes, and edges and text indications, so that the software code can be visualized. When a user selects a node or an edge in the displayed flow chart, a corresponding portion of the software code is also identified. In accordance with another embodiment, a portion of the software code defining an execution path is selected, and the system then calculates the logically most general condition for the possible execution of the selected path. In accordance with other embodiments, the path may be selected by a user, who highlights the nodes and/or edges along the displayed flow chart to calculate the conditions that allow the execution of the selected path, or by the system and the results of condition calculations are then presented to the user.

21 Claims, 5 Drawing Sheets

INTERACTIVE SOFTWARE TESTING SYSTEM AND METHOD

FIELD OF THE INVENTION

This invention relates to a system for testing software codes and more specifically to an interactive software testing system that tests concurrent program codes that share common variables.

BACKGROUND OF THE INVENTION

As computers are becoming an integral part of society, software codes for a variety of applications are being developed at an ever increasing pace. The life span of each version of a software program is decreasing as microprocessors and memory devices are becoming more powerful. Therefore, software developers are faced with generating new software code on a continuous basis.

As is evident to one who has ever written even a simple software code, the process of generating software and then testing it for any errors is detailed and time-consuming. In order to shorten the development cycle time of software code, many efforts have been made to develop reliable and convenient software testing systems for debugging software. Furthermore there has been efforts made to create software verification systems. Although software verification systems are more reliable than software testing systems, they require great amount of memory and system resources to operate. Thus, the preferred method to check the integrity of a software is to employ a software testing system.

Some of the prior art testing techniques are based on criteria for covering execution paths. For example, a variety of conditions are selected and a portion of a code is executed from a point A to some point B. Different coverage criteria are given as a heuristic measure for the quality of testing. One criterion, for example, is based on covering all the execution statements. Other criteria is based on covering all the logical tests, or all the flow of control from any setting of a variable to any of its possible uses. Thereafter, statistics are maintained on a global level relating to the effectiveness of different coverage approaches. Statistics are also maintained on a local level relating to the overall level of coverage achieved for the particular code tested.

Generally, the above-mentioned software testing systems are primarily based on software modeling techniques. These modeling techniques employ a complex array of algorithms, logics and proof systems. As a result, potential users are reluctant to learn new syntax, or perform the required modeling process.

One approach to avoid the need for modeling systems starts at the notation side. It provides design tools that are based on simple notations such as graphs, automata theory, as described in B. Selic, G. Gullekson, P.T. Ward, *Real Time Object-Oriented Modeling* (Wiley, 1993), or message sequence charts as described in R. Alur, G. Holzmann, D. Peled, *Message Sequence Charts*, Software: Concepts and Tools, 17 pp.70–77 (1996) or as described in U.S. Pat. No. 5,812,145. The system is then refined, starting with some simplistic basic design. Such tools usually provide several gadgets that allow the system designer to perform various automatic or human assisted checks. There is some support for checking or guaranteeing the correctness of some steps in the refinement of systems. Some design tools even support automatic code generation. This approach prevents the need for modeling by starting the design with some abstract model, and refining it into a full system. However, this approach is not efficient or simple. Furthermore, the above-mentioned software testing systems are not appropriate for concurrent programs that share one or more variables.

Thus, there is a need for an efficient and convenient software testing system that is applicable to both sequential and concurrent software programs.

SUMMARY OF THE INVENTION

A method for visualizing and testing a sequence of a software code that includes instructions relating to assignment of variables, and decision branches is provided. The method comprises the steps of generating a plurality of nodes, edges and text indications that correspond to the instructions in the software code. A plurality of pointers are then generated to associate the location of at least one line of the software code to at least one of the generated nodes. The pointers may also associate the location of a line in the software code to at least one of the generated edges. The method then displays a flow chart representing the generated nodes, and edges and text indications, so that the software code can be visualized. When a user selects a node or an edge in the displayed flow chart, a corresponding portion of the software code is also identified.

In accordance with another embodiment of the invention, a portion of the software code defining an execution path is selected. The system then calculates the logically most general condition for the possible execution of the selected path.

In accordance with yet another embodiment of the invention, the path may be selected by a user who highlights the nodes and/or edges along the displayed flow chart to calculate the conditions that allow the execution of the selected path. In an alternative arrangement, various paths may be selected by the system and the results of condition calculations are then presented to the user.

In accordance with yet another embodiment of the invention, the visualization and testing system described above is also applied to a collection of one or more codes for concurrent processes. As a result, the system provides a collection of graphical representations of the flow charts of the processes, so as to allow the user to select an interleaved path through the concurrent processes. Once such a path has been selected, the system calculates the logically most general condition for the possible execution of the path, and provides the calculation results as an output.

The software testing system in accordance with one embodiment of the invention allows the user to define a new path by inputting modifications to a previously selected path.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 1:
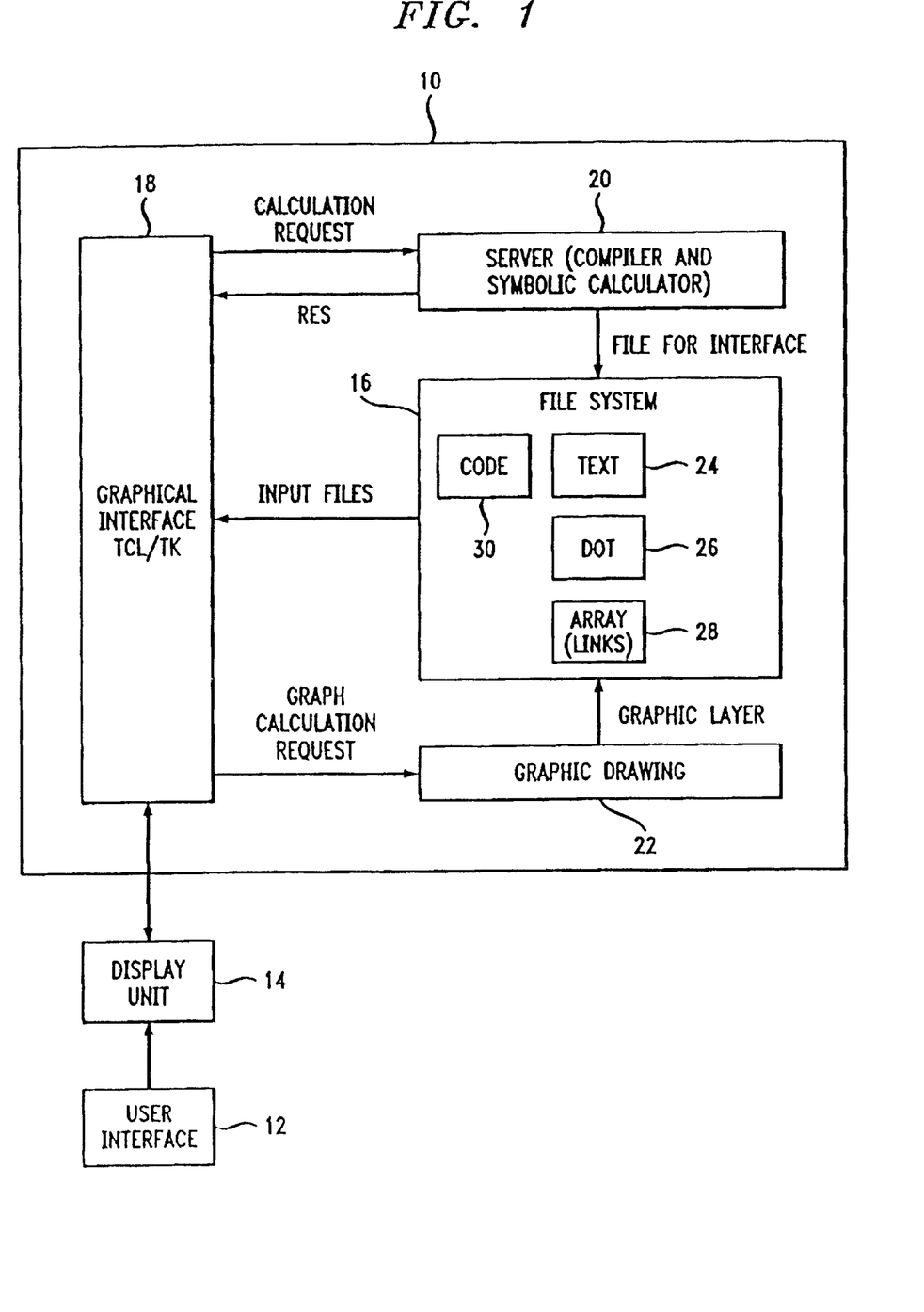
FIG. 1 illustrates a system for testing software codes in sequential and concurrent programs in accordance with one embodiment of the present invention.

FIG. 1 illustrates a software testing system 10 in accordance with one embodiment of the invention. It is noted that although the present invention describes a system that tests sequential or concurrent software programs, the same inventive principles apply to testing hardware systems, for example, systems that employ parallel processors. Furthermore, the components described in FIG. 1 may be implemented in either software or hardware arrangements.

Software testing system 10 includes a file system 16, which is configured to store various files relating to a sequential or a concurrent process. A sequential code, or process or software program refers to a single executable program, whereas, a concurrent code, or process or software program refers to at least two executable programs that run concurrently and share one or more variables.

File system 16 includes a text file 24 that contains the text of program constructs that define the software programs to be tested. Program constructs include individual operations that together accomplish a software task, such as "begin" statements, "end" statements, "if" statements, "if-then-else" statements, "wait" statements and "assignment" statements. It is noted that instead of storing one text file 24,file system 16 may include additional text files 24 for storing text of program constructs relating to a concurrent software program that is being tested.

File system 16 also includes a graph file 26 that contains information corresponding to a plurality of graphical object representations of the program constructs. Thus, each program construct is represented by a node and one or more edges or arcs that together define the flow chart or the flow chart of the software code. The graph file also contains the layout coordinates of the graphical objects to be displayed on a display unit 14 that is coupled to file system 16. Thus, graph file 26 contains information relating to the flow chart of a software code that is being tested by software testing system 10.

File system 16 also includes a link array file 28, which comprises a pointer array that includes information that correlates each graphical object in graph file 26 to the beginning and ending location of the corresponding portion of a code text in text file 24.

File system 16 is coupled to a graphical interface unit 18,which is responsible for tracking the selections of portions of software code that is being tested. Graphical interface 18 may be implemented in TCL/TK program. TCL and TK are two software packages as described in John K. Ousterhout *TCL and the TK Toolkit* (Addison-Wisely Professional Computing Series), and incorporated herein by reference. Briefly, these two software packages provide a programming system for developing and using graphical user interface (GUI) applications. TCL is a simple scripting language for controlling and extending applications. Its name stands for "tool command language." TCL provides generic programming facilities, such as variables and loops and procedures, that are useful for a variety of applications. One of the useful extensions to TCL is TK, which is a toolkit for the X window systems. TK extends the TCL facilities with commands for building user interfaces, so that a user can construct Motif-like user interfaces by writing TCL scripts instead of C language code.

It is noted that various portions of the software may be selected for testing purposes either by a user or by an automated testing arrangement.

A display unit 14,such as a computer monitor is coupled to graphical interface 18 so as to provide the user with a visual representation of the software that is being tested. As will be explained in more detail later, this visual representation includes textual information and graphical information relating to the software that is being tested. A user interface 12 is coupled to an input terminal of display unit 14 to allow the user to select various portions of the code for testing purposes.

Testing system 10 also includes a server unit 20 that is responsible for compiling the software code that is being tested and also calculating the conditions that are necessary for executing a selected portion of the software code. Server unit 20,in accordance with one embodiment of the invention, is implemented in standard meta language or SML language. ML refers to a family of programming languages, of which CAML and Standard ML are the two most widely used. Meta languages were primarily used as a programming language to manipulate object languages of logics for proving theorems. Standard ML language is a strongly-typed, polymorphically-typed, higher-order programming language with imperative features and a parametric module system.

Server unit 20 is coupled to graphical interface unit 18,and is configured to receive requests for processing selected portions of the software code to be tested from the graphical interface unit. Server unit 20 is also coupled to file system unit 16 so as to provide or update files that reside in file system unit 16. Graphical interface unit 18 is configured to receive path condition calculation results from server unit 20.

Testing system 10 also includes a graphic drawing unit 22,which is coupled to both graphical interface unit 18 and to file system unit 16. Graphic drawing unit 22 receives from graphical interface 18 information relating to graphic representation of a flow chart of a program that is being tested and employs a DOT program so as to provide the physical lay-out of the visual representations of software program that is being tested on display monitor 14. The DOT program is a tool for generating layout information for graphs, given an abstract description of the graph and is available from Bell Laboratories, N.J.

During operation, software testing system 10 is employed after a software code, or parts of it, has been designed and coded. Software testing system 10 checks the behavior of software code under various conditions and in various environments. Software testing system 10 translates the code into a flow chart representation as described hereinafter.

Figure 2A:
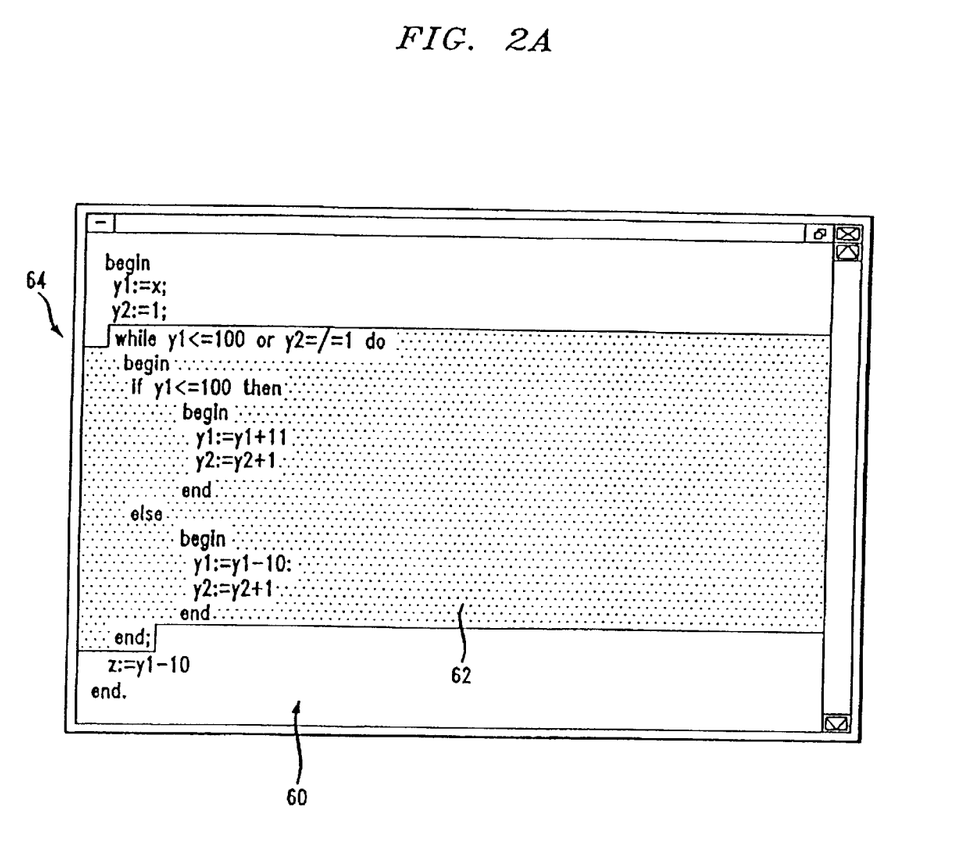
FIGS. 2*a* and 2*b* illustrate visual representations of a software code and the corresponding flow chart, dynamically linked together in accordance with one embodiment of the invention.

FIG. 2a illustrates an exemplary code 64 that may be tested by software testing system 10 in accordance with one embodiment of the invention. File system unit 16 provides a copy of code 64 to graphical interface unit 18. Graphical interface unit 18 may display this code on display unit 14 within a window 60 as illustrated.

Graphical interface unit 18 also provides the copy of code 64 to server unit 20 to compile the code so as to generate the corresponding flow chart of the code. In accordance with one embodiment of the invention, code 64 is written in a language that employs Pascal-like syntax, although the invention is not limited in scope in that respect and other languages may be employed in generating code 64.

Figure 2B:
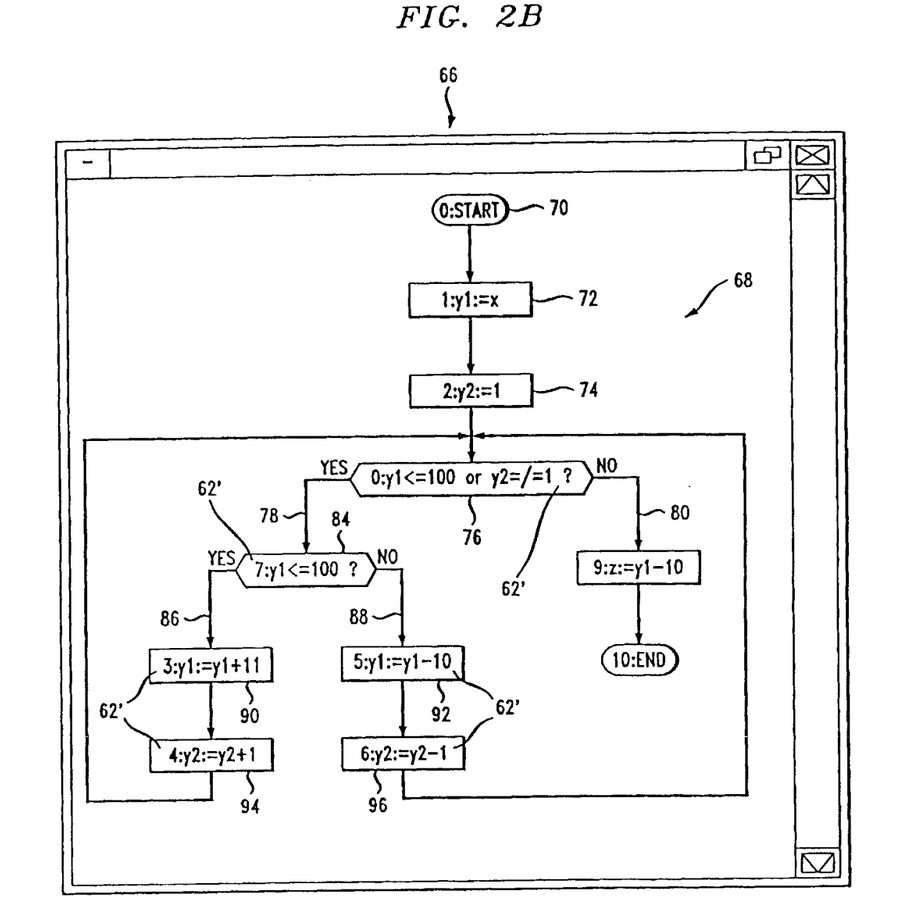

Thus, as illustrated in FIGS. 2a and 2b, server unit 20 translates code 64 into flow chart 68. For example, the first construct "begin" in code 64 is translated into a box 70 containing a text "0:START" in flow chart 68. Similarly, the assignments of variables "y1" and "y2" are translated to assignment boxes 72 and 74 containing corresponding assignment texts. The condition "while" in code 64 is translated to a diamond box 76. As illustrated two branches or edges 78 and 80 are also generated relating to the "YES" and "NO" conditions associated with "while" construct of code 64. Condition 82 of code 64 is translated to diamond box 84 in flow chart 66. Again two branches or edges 86 and 88 out of box 84 are generated relating to "YES" and "NO" conditions associated with the "if" construct of condition 82 of code 64.

In accordance with one embodiment of the invention server unit 20 generates a DOT file that contains the information on nodes and edges, in DOT syntax, relating to the graph representations for flow chart 68. This DOT file is then provided to graphic drawing unit 22 via graphical interface unit 18 to determine the physical layout of the nodes and edges on display unit 14. Thus, graphic drawing unit 22 annotates graph objects with specific coordinates. Such coordinates depend, among other things, on the size of display unit 14, the number of concurrent programs being tested, the size of each program and other physical constraints of the system. Once graphic drawing unit 22 completes its graph lay-out operation, it generates an updated DOT file that includes the physical lay-out information as well. The updated DOT file is then provided to graphical interface unit 18 so that it could be displayed on display unit 14, as processed by the TCL/TK program employed by the graphical interface unit.

Server unit 20 also generates an adjacency list, specifying for each node of the graph its immediate successor. This information allows graphic interface unit 18 to control path selection as described hereinafter.

Referring to FIGS. 2a and 2b again, graphical interface unit 18 displays via display unit 14 separate windows 60 and 66 relating to the text of code 64 and its corresponding flow chart 68. In accordance with one embodiment of the invention, windows 60 and 66 are context sensitive. As a result, pointing to a node or an edge on flow chart 68 highlights the corresponding portion of code 64 in source window 60. This context sensitivity is achieved because of the information contained in array file 28 of file system unit 16. Therefore, when the user employs user interface 12 to point on or highlight a graph object displayed on display unit 14, graphical interface 18 queries array 28 to determine the location of the portion of the code that corresponds to the highlighted node or the highlighted edge. As a result, graphical user interface also highlights the corresponding portion of the code.

Thus, graphical interface unit 18 allows the user to select a path on flow chart 68 that spans a plurality of nodes, and corresponding edges, although the invention is not related in scope in that respect. For example, software testing system 20 may include a file that contains various path selection criteria that is used to automatically suggest the feasible paths that can be tested. Thus, the user selects a desired path for testing by clicking on corresponding nodes or edges. Graphical interface unit 18 highlights each node or each edge that the user selects.

FIG. 2b illustrates nodes 62' that together define a selected path. As illustrated in FIG. 2a, graphical interface unit 18 highlights the corresponding portion 62 in source window 60. This arrangement allows the user to visualize a portion of a software code on a corresponding flow chart. This tool remarkably simplifies the task of analyzing a software code.

The selected path appears also as a path selection arrangement text on a separate window on display unit 14, where each line lists the selected node, the process and the shape. For concurrent programs, the lines are also indented according to the process to which they belong. For example, lines without indentation belong to a first process, lines with one indentation belong to a second process, lines with double indentation belong to a third process and so forth.

The context sensitive highlighting also applies to this path selection arrangement text. Each line of the path selection text includes a process identifier followed by the number of the node that is selected within a path. This information is enclosed in a bracket when the corresponding code construct is an "assignment." The information is enclosed in "< >" (diamonds) when the code construct is a "condition." The information is enclosed in "( )" (parentheses) when the code construct relates to a "begin" or "end" statement. An example of a path selection text arrangement is illustrated in connection with discussions referring to FIGS. 3 and 4.

Graphical user interface 18 allows the user to alter a selected path by removing transitions from the end of a path, in reverse order. Thus, the user, for example, can select an alternative choice for a condition; for example, "YES" choice after a condition to a "NO" choice after that condition. However, the user must first remove the nodes that were originally chosen after that condition.

When concurrent programs are being tested, the way the execution of transitions from different nodes are interleaved is an important source of software problems. Thus, in the context of concurrent programs, another way to alter a path, is to use the same transitions, but allow a different interleaving of the events between the concurrent programs. For example, the order of adjacent transitions on the selected paths may be flipped so as to obtain all possible executions of the selected paths.

Server unit 20 is also responsible to test the selected portion of a software code by calculating the conditions that are necessary to execute the selected path of the code. It is noted that it is not only the appearance of a node in the path which affects the execution order, but also the appearance of a successor node from the same process. This follows because considering only the nodes in the flow chart may not be sufficient to determine how they are executed. For example, when the node is a test condition, the execution of this test condition is determined also by whether its "YES" or the "NO" exit edges were selected. Thus, if a test node is the last transition of some process in the selected path, it would not contribute to the path condition, since the information about how it is selected is not provided. Similarly, a "wait" statement may not be sufficient to determine how it is executed. The wait statement has only one exit edge, followed when the condition holds. If the "wait" statement is the last statement of a selected path, there is no information whether the condition holds, or the process is waiting for the condition to hold.

The steps to determine the conditions that are necessary to span a selected path is explained hereinafter with reference to a path condition calculation flow chart illustrated in FIG. 5. Following definitions are employed in accordance with one embodiment of the invention.

Let $=s_1, s_2, \ldots s_n$ be a sequence of nodes in a selected path. For each node $s_i$ on the path the following definitions are employed:

type {$s_i$} is the type of transition in $s_i$. This can include, among other constructs, one of the following: begin, end, test, wait, assignment.

proc{$s_i$} is the process to which $s_i$ belongs, when concurrent processes are being tested.

cond{$s_i$} is the condition on $s_i$, in case that node s, is either a "test" or a "wait" transition.

pos{$s_i$} is a predicate that holds when node $s_i$ is a test and it has a successor in the path that belongs to the same process. Furthermore, if node $s_i$ is not a "wait" statement, the edge form node $s_i$ to that successor is labeled by "YES."

expr{$s_i$} is the expression assigned to some variable, in case that $s_i$ is an assignment transition.

var($s_i$) is the variable assigned, in case si is an assignment statement.

p{fv/e} is the predicate p where all the free occurrences of the variable v are replaced by the expression e. In a logical formula, like the one constructed for a path condition, a variable occurrence is free, if it is not in the scope of a quantifier ("for all", or "there exists"). For the programming language considered in the exemplary embodiment of the present invention, all variables in the path condition are free. However, this changes when procedure calls are added to the language. Consequently, the path conditions would contain clauses that quantify the variables that are local to the procedure. All occurences of the quantified variables within those clauses are not deemed free.

Figure 5:
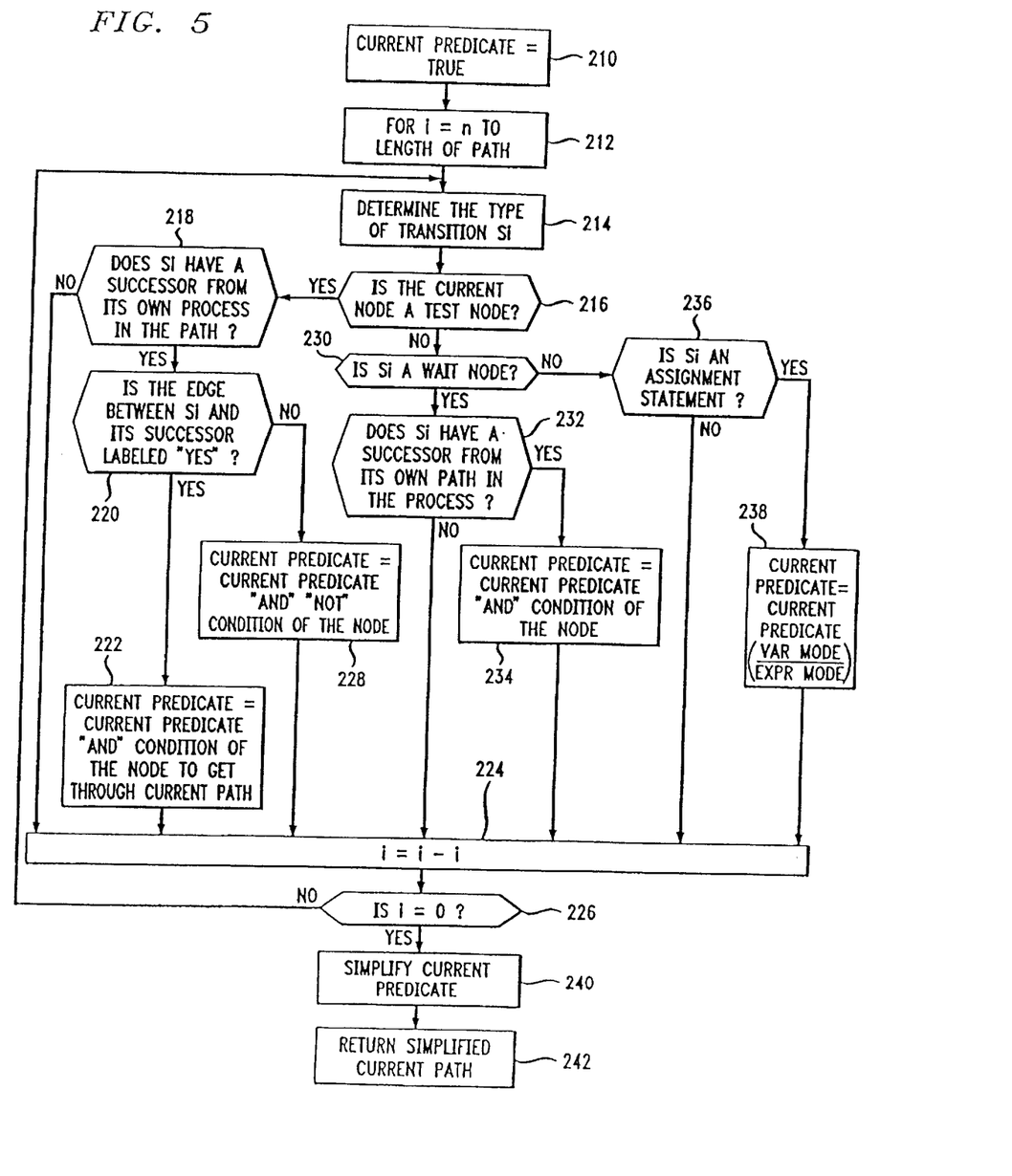
FIG. 5 is a chart illustrating the steps taken to calculate conditions of a user selected portion of a software in accordance with one embodiment of the invention.

Referring to FIG. 5, server unit 20, after receiving a request to calculate the condition of a selected path begins step 210 by setting the status of the current predicate of the selected path, current_pred, as "true". It is noted that server unit 20 begins its calculations from the last node of the path to the first node of the path in reverse order.

At step 212, server unit 20 begins a calculation loop for all nodes that need to be considered for a selected path. At step 214, server unit begins to determine the type of the transistion of the current node $s_i$.

At decision step 216, server unit 20 determines whether the current node is a test node. If so, it goes to step 218, and if not it goes to step 230. At step 218, server unit determines whether $s_i$ has a successor from its own process in the tail of the path. If it does, then server unit goes to step 220 to determine whether the edge between $s_i$ and this successor is labeled with "YES". If the edge is labeled with "YES", then server unit goes to step 222, and concatenates current predicate with the condition of the current node, cond ($s_i$). If the edge is labeled with "NO" instead, server unit goes to step 228, and concatenates current predicate the inverse of cond ($s_i$).

After either step 222 or step 228, or if $s_i$ does not have a successor in step 218, server unit goes to step 224 where it decrements the path index i, and then goes to step 226 to test if server unit has finished traversing the path. If server unit has finished, then it goes to step 240 to simplify the condition found for the path selected. If it has not, then it returns to step 214 to process the next node.

If at decision step 216, the current node, $s_i$, is not a test node, then server unit 20 goes to step 230 to determine whether the current node is a "wait" node. If so, server unit determines whether $s_i$ has successor from its process in the tail of the path. If it does, then server unit goes to step 234 and concatenates current predicate with the condition of the current node, cond ($s_i$), and then it goes to step 224 to either set up to process the next node if there is one, or to simplify the predicate for the path condition if server unit is finished with the path. If it has no successor, the server unit goes directly to step 224, again to either set up to process the next node if there is one, or to simplify the predicate for the path condition if server unit is finished with the path.

At decision step 230, if the current node is not a "wait" node, server unit 20 goes to step 236 to determine whether the current node si is an assignment. If so, server unit 20 goes to step 238 and substitutes the variable of the assignment with the expression being assigned to the variable in the current predicate. The predicate resulting from this substitution, current_pred {var $s_i$}/ expr {$s_i$}, is the new value of current predicate. Thereafter, server unit 20 goes to step 224 and to step 226 to determine if other nodes are outstanding. If so, server unit returns to step 214 to analyze the remaining nodes. Otherwise, server unit 20 goes to step 238 to simplify the condition found for the path selected.

Figure 4A:
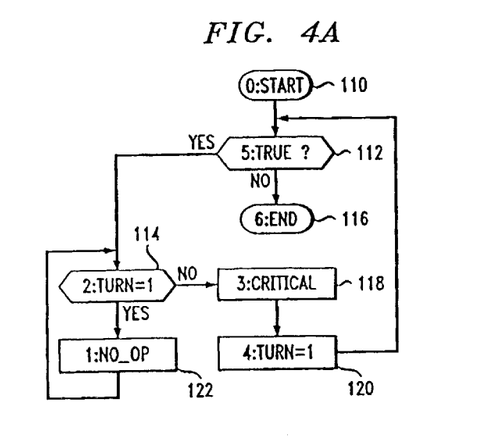
FIGS. 4a and 4b illustrate a visual representation of a flow chart of two concurrent software programs relating to user selected portions of the two software codes in accordance with one embodiment of the invention.

As an example, the calculation steps discussed in reference with FIG. 5 are applied to a flow chart displayed on display unit 14 and illustrated in FIG. 4a. Assume, that nodes 112, 114, 118, 120, 112, 114 and 118 are selected in a sequence, as part of a selected path to be tested. Server unit 20 begins the calculation step with the last node in the selected path; node 118. It also initiates current_pred as true for node 118. Server unit 20 then considers the next node up in the sequence which is an "if" condition node 114. Because node 114 exited from its "NO" branch to node 118 in the selected path, current_pred=true "and" "not" turn=1 which means the execution to proceed from node 114 to node 118, the variable "turn" should not be equal to 1 at node 114.

Server unit 20 then considers the next node up in the sequence which is an "if" condition node 112. Because node 112 exited from its "YES" branch to node 114 the value of current_pred="true" and "not" "turn"=1 and "true" remains the same.

Server unit 20 then considers the next node up in the sequence, which is an assignment node 120. As a result, server unit 20 substitutes a "1" for variable turn. Thus current_pred=true "and" "not" 1=1 and true resulting in a false current_pred, because of the inconsistency of 1 1. This indicates that the software code corresponding to the flow chart of FIG. 4a can not span nodes 112, 114, 118 and 120 twice consecutively under any condition.

It is noted that the meaning of a calculated path condition is different for sequential and concurrent programs. In a sequential program, consisting of one process, the condition expresses all the possible assignments that would ensure the execution of the selected path, starting from the first selected node. For concurrency programs, the condition expresses the assignments that would make the execution of the selected path possible. Thus, when concurrence is present, the path condition does not guarantee that the selected path is executed, as there might be alternative paths that may be selected with the same variable assignments.

It is also noted that although the above examples calculate the conditions based on analyzing constructs within a node, it is also possible to calculate the conditions based on analyzing the edges, in accordance with the principles of the present invention. Thus, a data structure in file system unit 16 is created that contains information relating to all the edges in the flow chart, including the label on each edge, such as "YES" or "NO," the construct at the node at the beginning of each each and the construct at the node at the end of each edge. This type of data structure allows for a more efficient path calculation, since a user may select only edges to define an execution path. The system then highlights both nodes at each end of a selected edge. This approach prevents the situations where a user selects a "decision" node that exits by two edges, without selecting the node that follows from one of the edges. In such situations, the selection of the decision node without selecting which decision was taken does not contribute to the path calculation.

It is also noted that, although in the exemplary system described above the user selects a path based on highlighting nodes and edges on a displayed flow chart, the invention is not limited in scope in that respect. For example, the nodes and edges corresponding to a software code can be described in text format, and the user may select a path by specifying desired nodes and edges in text format as well.

Figure 3A:
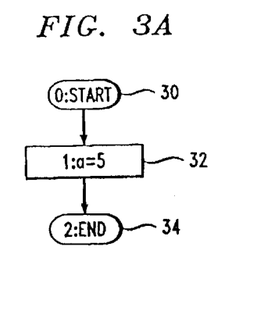
FIGS. 3*a* and 3*b* illustrate a visual representation of a graph flow relating to a user selected portion of an exemplary software code in accordance with one embodiment of the invention.
Figure 3B:
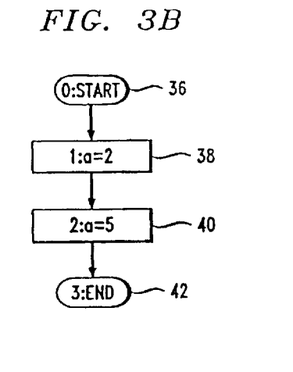

FIGS. 3a and 3b illustrate flow charts corresponding to two processes having process identifiers C1, and C2, that share the variable a. The PASCAL code for the processes is as follows C1:begin
    a:=5
end.
C2:begin
    a:=2
    wait a=5
end.

An exemplary path may be selected by a user such that a sequence of nodes 30, 36, 38, 32, 40, 42 and 34 are highlighted on display unit 14. In response server unit 20 displays the following path selection arrangement text on a separate window on display unit 14:

(C1:0)
    (C2:0)
    [C2:1]
[C1:1]
    <C2:2>
    (C2:3)
(C1:2)

In this path, the "a:=5" of the first process, at node 32, is executed after the "a:=2" assignment, and, hence the wait condition can be passed, and the path can be completed. This does not depend on the initial value of any variable. Thus, the path condition is "true."

If however, the selected path is changed so that the third and the fourth lines are switched, such that (C1:0)
    (C2:0)
[C1:1]
    [C2:1]
    <C2:2>
    (C2:3)
(C1:2)

the two assignments to the variable a are switched, and the path cannot be passed, independently of any initial values of the variables. Thus, in this case the path condition is "false."

It is noted that if the line (C2:3)

was not present, server unit 20 would not have the information about how the "wait" node 40 was resolved, and hence it would be ignored. In that event, node 40 would be used for the purpose of denoting that the control has passed in process C2 past the "a:=2" assignment statement in node 38.

Figure 4B:
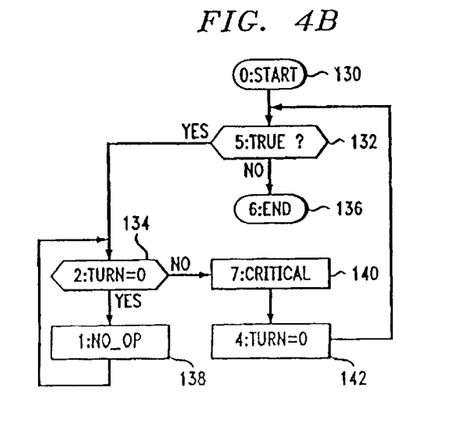

Additional examples relating to FIGS. 4a and 4b are described hereinafter. The flow charts illustrated in FIGS. 4a and 4b relate to a mutual exclusion example, where one process enters its corresponding critical section, if a shared variable "turn" does not have the value of the other process. The code for the first process is as follows:

while true do
    begin
        while turn=1 do begin (* no-op *) end;
        (* critical section *)
        turn:=1
    end
end.

The second process is similar, except that constant value 1 has changed to 0. An exemplary path is selected comprising nodes 110, 130, 132, 112, 134, 114, 140 and 122. This path admits the second process referred to as mutex1, to the critical section, while the first process referred to as mutex0 is busy waiting as follows:

(mutex0:0)
    (mutex:0)
    <mutex1:5>
<mutex0:5>
    <mutex1:2>
<mutex0:2>
    [mutex1:3]
[mutex0:1]

Path condition calculation by server 20 results in a path condition turn=1, namely that the second process will get first into its critical condition if initially the value of the variable turn is 1.

If, however, the selected path is altered, such that both processes immediately get to their corresponding critical sections, namely (mutex0:0)
    (mutex1:0)
    <mutex1:5>
<mutex0:5>
<mutex0:2>
    <mutex1:2>
[mutex0:3]
    [mutex1:3]

the resulting path conditions are turn 1 and turn 0 are obtained. This condition suggests that a mutual exclusion may not be available if the initial value would be, say, 3.

As illustrated above, during the calculation process, server unit 20 may obtain a sequence of conditions that are calculated symbolically, and can therefore become difficult to understand. In most cases, the generated expression for the condition is equivalent to a simpler expression.

Thus, in accordance with one embodiment of the invention, server unit 20 also simplifies the obtained conditions. One approach for simplifying first order condition formula is to first try to apply several simple term-rewriting rules in order to perform some general purpose simplifications. In addition, server unit 20 determines whether the condition formula is of the special form of Presburger arithmetic, i.e., allowing addition, multiplication by a constant, and comparison. If this is the case, server 20 employs the following decision procedures to simplify the obtained condition formula:

Boolean simplification, e.g., and true is converted into , and and false is converted into false.

Eliminating constant comparison, e.g. replacing 1>2 by false.

Constant substitution. For example, in the formula x=5 and every (free) occurrence of x in is replaced by 5.

Arithmetic cancellation. For example, the expression (x+2)−3 is simplified into x−1.

Thus, software testing system 10 in accordance with various embodiment described above provides a tool for a user to visualize the flow chart of a software code that is being tested and interactively select a portion of the code to be tested. The selected portion can then be tested and all conditions that are necessary to execute the selected path are obtained.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. A method for visualizing a sequence of a software code including instructions relating to assignment of variables, and decision branches, the method comprising the steps of:

generating a plurality of nodes, edges and text indications corresponding to said assignment and decision instructions;

generating a plurality of pointers associating the location of at least one line of said software code to at least one of said nodes and edges;

displaying on a first portion of a display screen a flow chart representing said nodes, edges and text indications corresponding to said assignment decision instructions; and displaying on a second portion of said display screen said software code by displaying said assignment and decision instructions and their corresponding text indications wherein displayed portions of said software code correspond to displayed portions of said flow chart.

2. The method in accordance with claim 1 further comprising the step of identifying a portion of said software code corresponding to at least one node selected in said displayed flow chart.

3. The method in accordance with claim 2 further comprising the step of displaying said software code on a display unit and said step of identifying further comprises the step of highlighting said portion of said software code corresponding to the selected node.

4. The method in accordance with claim 3, wherein said steps of displaying further comprises the step of displaying said flow chart and said text code respectively within corresponding windows displayed on a display screen.

5. The method in accordance with claim 4 further comprising the step of selecting a plurality of nodes so as to define an execution path.

6. The method in accordance with claim 5 further comprising the step of computing a set of conditions necessary to execute a selected path.

7. The method in accordance with claim 6 further comprising the step of simplifying said set of conditions.

8. A method for testing a software code including instructions relating to assignment of variables, and decisions branches, the method comprising the steps of:

generating an array of nodes and edges information representing constructs of said software code;

selecting a portion of said nodes and edges to define a selected path;

computing a set of conditions necessary to execute said selected path, such that said conditions express all possible assignments of said variables ensuring execution of said selected path, starting from first node selected; and analyzing said nodes and edges in reverse order from the last selected node or edge to the first selected node and assigning an initial condition current_predicate as "true."

9. The method in accordance with claim 8 further comprising the step of determining the type of transition of each node that is being analyzed.

10. The method in accordance with claim 9 further comprising the step of concatenating a condition of a decision node to said current_predicate when a "YES" branch of said decision node is selected.

11. The method in accordance with claim 9 further comprising the step of concatenating an inverse of a condition of a decision node to said current_predicate when a "NO" branch of said decision node is selected.

12. The method in accordance with claim 9 further comprising the step of substituting said current_predicate with an expression assigned to a variable in an assignment node.

13. The method in accordance with claim 9 further comprising the step of concatenating condition of a wait node to said current_predicate when said wait node has a selected successor node.

14. The method in accordance with claim 8, further comprises the steps of displaying on a display screen a flow chart and text code corresponding to said nodes and edges.

15. The method in accordance with claim 14 further comprising the step of selecting a plurality of nodes and edges on said flow chart so as to define said selected path.

16. A method for testing at least two concurrent software codes sharing at least one variable comprising the steps of:

displaying each of said software codes on a portion of a display unit designated for display of said software codes;

displaying on separate portions of said display unit flow charts each corresponding to one of said software codes including nodes, edges and text indications, said flow charts providing a visualization of said software codes so as to select a variable portion of said displayed flow chart;

generating a plurality of pointers associating the location of at least one line of each one of the software codes to at least one of said corresponding nodes and edges; and highlighting a portion of each one of said displayed software codes corresponding to one of said nodes and edges selected in said displayed flow charts.

17. The method in accordance with claim 16, wherein said steps of displaying further comprises the step of displaying said flow charts and said text codes respectively within corresponding windows displayed on a display screen.

18. The method in accordance with claim 17 further comprising the step of selecting a plurality of nodes and edges in an interleaved arrangement between the displayed flow charts so as to define an execution path.

19. The method in accordance with claim 18 further comprising the step of computing a set of conditions necessary to execute said selected execution path.

20. The method in accordance with claim 19 further comprising the step of simplifying said set of conditions.

21. The method in accordance with claim 20 wherein said computing step further comprises the step of determining conditions necessary to execute the last node contained in said selected path and updating said conditions by sequentially determining the conditions necessary to execute prior selected nodes contained in said selected path.

* * * * *